United States Patent [19]

Kamins et al.

[11] 3,993,362
[45] Nov. 23, 1976

[54] ANTI-JACKKNIFING AND SKIDDING CONTROL SYSTEM

[76] Inventors: Jerome H. Kamins, 1036 Mayfair Road, Baldwin, N.Y. 11510; Michael I. Mandell, 15 Westland Drive; Harry Armen, Jr., 27 Jefferson St., both of Glen Cove, N.Y. 11542; Paul Savet, 505 Alica Drive, Westbury, N.Y. 11590

[22] Filed: Apr. 1, 1975

[21] Appl. No.: 563,958

Related U.S. Application Data

[63] Continuation-in-part of Ser. No. 380,658, July 19, 1973, abandoned.

[52] U.S. Cl.................... 303/21 BE; 180/103 BF; 188/112; 303/7; 303/21 B
[51] Int. Cl.²........................................... B60T 8/02
[58] Field of Search.......... 180/103 R, 103 BF, 104; 188/3 R, 112, 181 C; 280/446 B; 303/7, 20, 21, 96, 100, 106; 340/53

[56] References Cited
UNITED STATES PATENTS 3,288,240 11/1966 Franzel .................... 180/103 BF X
3,566,987 3/1971 Franzel .................... 180/103 BF
3,758,165 9/1973 Savelli .................... 303/20
3,894,773 7/1975 Cleveland et al. ........ 303/21 A
3,895,683 7/1975 Lang et al. ............... 180/103 BF

*Primary Examiner*—Stephen G. Kunin
*Attorney, Agent, or Firm*—Steinberg and Blake

[57] ABSTRACT

An anti-jackknifing and skidding control system for trailer trucks is described, wherein a linear accelerometer located on the rear of the trailer detects left or right skidding and provides automatic differential braking action to the left or right wheels depending on the direction of skidding to be corrected. The system distinguishes a usual coordinated turn or truck maneuver from a skidding condition to correct only for the latter. In addition, wheel locking is prevented by releasing the braking action, when such wheel locking is detected.

14 Claims, 15 Drawing Figures

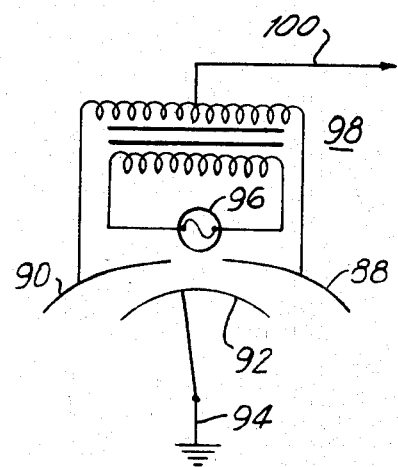
FIG. 8
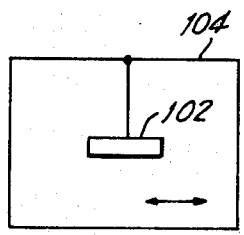
FIG. 9
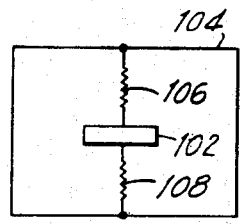
FIG. 10
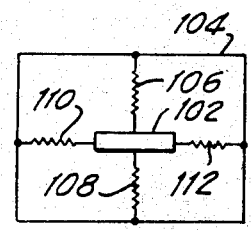
FIG. 11
FIG. 12
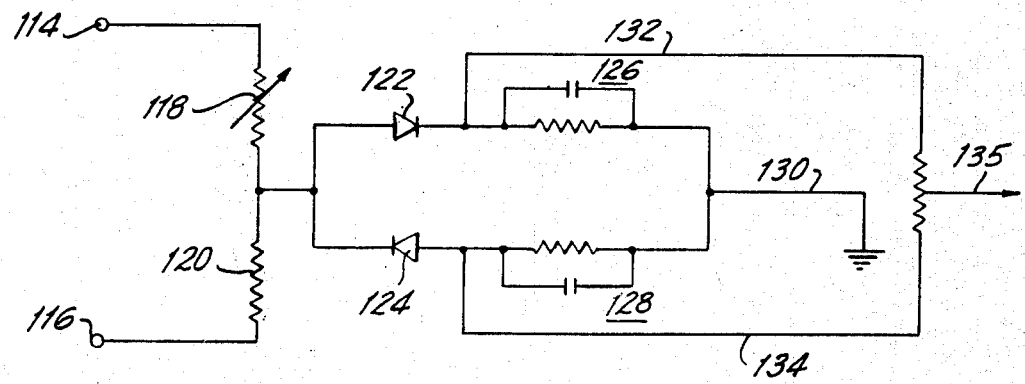

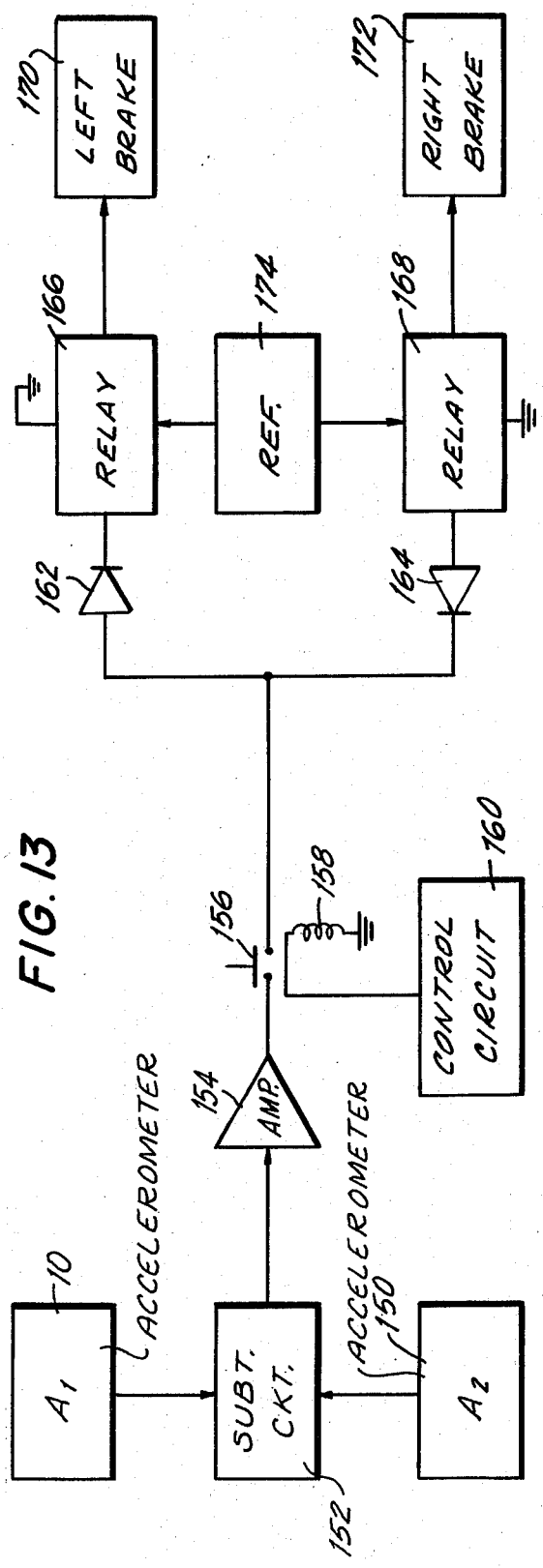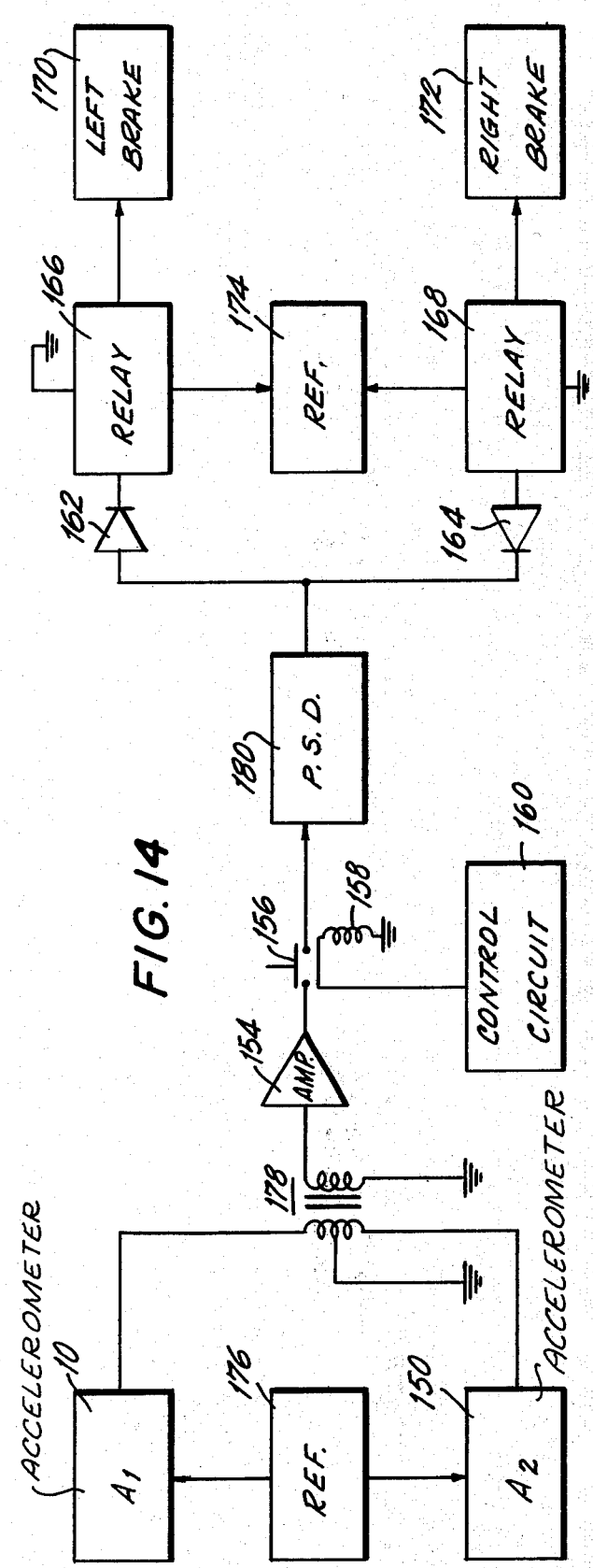

ANTI-JACKKNIFING AND SKIDDING CONTROL SYSTEM

CROSS REFERENCE TO RELATED APPLICATION

This is a continuation-in-part application of Ser. No. 380,658 filed on July 19, 1973, now abandoned, by the inventors of the present invention.

BACKGROUND OF THE INVENTION

This invention relates to a brake control system, and more particularly to anti-jackknifing and skidding controls for a vehicle having a cab and a trailer portion.

One of the major problems faced by truck users is the possibility of jackknifing wherein the trailer portion of the truck skids sideways out of control of the driver. This problem is frequently caused by dangerous road conditions such as ice, water, snow, or mud, taken by themselves and/or possibly in combination with an improper maneuver made by the driver in an emergency situation. With the increased use of trailer trucks on superspeed highways, the possibility of damaging the truck as well as causing a severe traffic accident has made the skidding and jackknifing problem most serious.

This problem has caused federal and state governments to institute strict requirements which effectively call for straight line stops and a minimum of side to side motions. These requirements can be met generally with some form of electronic anti-skid system which basically prevents the possibility of jackknifing and skidding problem. The known brake systems are complex and frequently rely on computers as well as sensors to prevent brakes from locking. Also, these systems generally require the sensors to be mounted in a predetermined relationship to the wheels and also provide direct control to the brake system in the vehicle to apply braking action on all of the wheels equally. Also, most of these systems act to usurp control of the existing brake system away from the driver.

The jackknifing and skidding problem is not unique to trailer trucks since skidding can occur on a standard type automobile as well. However, in a standard two-axle vehicle, should skidding occur, it suffices to turn the front wheels into the direction of the skid to alleviate the skidding problem. The turning of the wheels into the direction of the skid provides a suitable opposing torque, to that created by the skid, which frequently remedies the skidding problem. However, this solution will not work in a multi-axle truck of the tractor-trailer type, and, in fact, a maneuver of the cab or tractor itself has but negligible effect upon the trailer portion should the skid occur in the trailer part of the vehicle.

U.S. Pat. No. 3,288,240 has suggested the use of a mercury switch in the trailer portion of a towed vehicle and, based upon the direction of lateral sway, for example, a differential type braking is applied to either the right or left wheels of the trailer. This approach of differential braking may be useful in alleviating swaying or swerving problems. However, the stability control system described in the aforementioned patent cannot differentiate between a coordinated turn and a jackknifing condition. For example, a truck driver traveling on a highway containing sharp curves will maneuver the truck around the curves at almost regular highway speeds. The accelerometer will detect lateral acceleration of the trailer and will interpret it as being a skidding or jackknifing condition. It will then apply a differential braking to the wheels on one side of the truck which will actually initiate a skidding condition and will force the truck to skid or jackknife into an adjacent lane, thereby causing accidents to occur.

Furthermore, in applying the automatic stability control of the aforementioned patent, when a jackknifing condition is sensed, differential braking will be continuously applied until the acceleration has ceased. However, for severe skidding and jackknifing conditions such continuous braking may cause the wheels to lock which would again make the condition worse rather than improving it.

SUMMARY OF THE INVENTION

It is therefore an object of the present invention to provide an anti-jackknifing and skidding control system which alleviates the aforementioned problems of the prior art devices.

A further object of the invention is to provide an anti-jackknifing and skidding control system for use on tractor trailer type trucks as well as other types of towed vehicles.

Yet a further object of the invention is to provide an anti-jackknifing and skidding control system which detects a skidding motion of the rear portion of the vehicle at an early stage of its initiation so that a corrective action can be introduced in time to avoid serious problems.

Another object of the invention is to provide an anti-jackknifing and skidding control system which provides an automatic differential braking action on the left or right wheels separately depending on the direction of skidding to be corrected.

Still another object of the invention is to provide an anti-jackknifing and skidding control system which prevents a locking of any one of the wheels during the corrective action.

A still further object of the invention is to provide an anti-jackknifing and skidding control system which differentiates a skidding condition from a usual turning or maneuvering condition.

Another object of the invention is to provide an anti-jackknifing and skidding control system which provides corrective braking to the left or right brake of the vehicle independently of each other.

A further object of the invention is to provide an anti-jackknifing and skidding control system which actuates corrective control upon the brake system without usurping control from the driver.

Still another object of the invention is to provide an anti-jackknifing and skidding control system which provides an indication to the driver that the control system is applying corrective measures to deter the possibility of a skidding condition.

Yet a further object of the invention is to provide an anti-jackknifing and skidding control system which can operate an AC or DC.

In an illustrative embodiment of the invention there is provided a linear accelerometer means near the rear of the towed portion of a vehicle, which can detect acceleration in a direction transverse to the direction of movement of the vehicle. The accelerometer produces an output signal having both a sign portion indicating left or right movement as well as a magnitude portion indicating the amount of the acceleration. A coordinated turn detection means is also coupled to the towed section and produces a coordinated turn signal. A combining means coupled to both the accelerometer means and the coordinated turn detection means combines the output signal with the coordinated turn signal to thereby distinguish a proper maneuver from an uncontrolled skidding or jackknifing condition. The output from the combining means is a first electrical signal responsive to uncontrolled acceleration to the left, or a second electrical signal responsive to uncontrolled acceleration to the right. Coupling means connects the first electrical signal to the actuating means controlling the left wheel brakes for applying a braking action only to the left wheel brakes and for coupling the second electrical signal to the actuating means controlling the right wheel brake for applying a braking action only to the right wheel brakes, whereby a differential braking action is achieved responsive only to an uncontrolled jackknifing or skidding condition.

In one embodiment of the invention the coordinated turn detection means is a second accelerometer means located in the front portion of the towed section of the vehicle. In another embodiment of the invention the coordinated turn detection means is an angular rate sensor positioned at the hitch between the cab and the trailer for determining the closure rate between the trailer portion and the cab portion.

In a further embodiment of the invention wheel locking is detected and prevented by gradually and/or intermittently disengaging the corrective braking action of the system. The speed of the front wheels of the trailer section are compared with the speed of both the right and left rear wheels respectively. The difference is applied to a disengaging circuit connected to the anti-jackknifing control system.

Suitable switches are provided for the driver to completely deactivate the system thereby permitting him to initiate routine maneuvering without interference of the system of this invention. Also, automatic deactivation of the system occurs in the case of the failure of the existing brakes in the vehicle. A warning light is also provided, which can be in view of the driver, to indicate when corrective action is taken to warn the driver of the existence of a dangerous condition.

BRIEF DESCRIPTION OF DRAWINGS

The invention is illustrated by way of example in the accompanying drawings which form part of this application and in which:

FIGS. 6–8 show various examples of transducers for use with this invention;

FIGS. 9–11 show various examples of sensing devices for use with this invention;

FIG. 12 shows a schematic circuit diagram of a comparator for use with this invention;

FIG. 13 shows another embodiment of the present invention utilizing a DC arrangement and including a circuit for preventing wheel locking;

FIG. 14 shows an embodiment similar to that of FIG. 13 for use with AC current.

DESCRIPTION OF PREFERRED EMBODIMENTS

Figure 1:
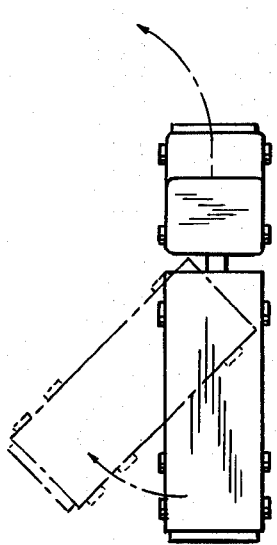
FIG. 1 is a schematic plan view of a truck indicating a skidding condition.

In a standard two axle vehicle, when a skid occurs wherein the rear of the vehicle begins sliding in a direction transverse to the direction of movement of the vehicle, the usual procedure for eliminating the skid is to turn the car into the direction of the skid. The mechanical explanation for this maneuver is illustrated in FIG. 1. Assume that the rear of the vehicle begins sliding to the left. The skidding motion produces a clockwise torque, as viewed in FIG. 1. To counter the skidding torque it is necessary to introduce a counterclockwise torque. This is achieved by turning the front wheels into the direction of the skid thereby introducing the counterclockwise torque as the vehicle proceeds in a forward direction veering towards the left, as viewed in FIG. 1. The counterclockwise torque therefore alleviates the possibility of a complete skid.

When dealing with a tractor-trailer combination of the type shown in FIG. 1, if the rear of the truck begins to slide to the left causing a clockwise torque, it is necessary to apply a counterclockwise torque to affect a correction. Should the front cab be turned into the direction of the skid, namely toward the left, as with a two axle vehicle, there would be very little effect on the rear trailer portion. Since the trailer is only hinged to the cab, it would continue to swing almost independently of the cab maneuver. Thus, it is necessary to apply the corrective torque to the trailer itself rather than to the cab. The present invention proposes to produce the necessary corrective torque, effectively simulating the turning of the wheels into the direction of the skid. This corrective torque is achieved by applying braking action to only one side of the vehicle, the left side or the right side, to correct the skid. In the example shown in FIG. 1, to create the necessary counterclockwise torque, it is necessary to apply a braking action to the left wheels. In this manner the continued motion of the vehicle in the forward direction with the left wheels in a condition of braking, produces the counterclockwise torque on the trailer portion which serves to correct the clockwise torque introduced by the skidding.

In some vehicles there are separate brakes for the cab and trailer portions of the truck and accordingly it would be sufficient only to apply the corrective differential braking action to the trailer portion of the vehicle. In other types of trucks both the cab and the trailer portions are controlled by the same braking system and accordingly the same differential braking action would be applied to both the cab and trailer. Furthermore, regardless of the type of braking system used, disc brakes, electric brakes, pneumatic brakes, hydraulic brakes or other types, the present system would work by providing the necessary brake signal to an actuating element already existing in the vehicle to control the brakes.

The purpose of the present invention is to provide an automatic differential braking action on the left or right wheels depending on the direction of the skidding to be corrected and for distinguishing a coordinated turn or other proper maneuver from a jackknifing or skidding condition.

Figure 2:
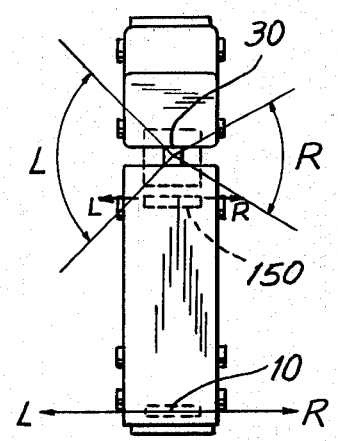
FIG. 2 is a plan view of a truck indicating the location of sensing devices for use in accordance with this invention.
Figure 3:
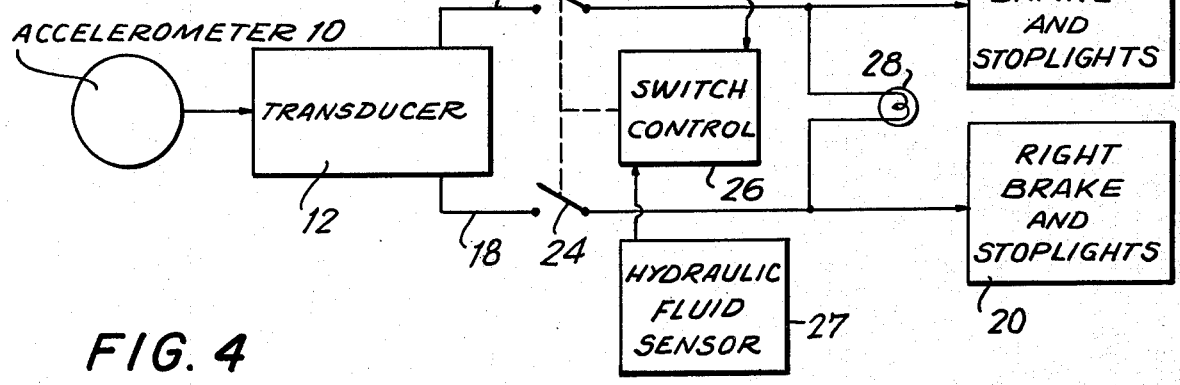
FIG. 3 is a schematic block diagram of a basic differential braking system.

Referring now to FIGS. 2 and 3 there is shown the basic idea of differential braking in a towed vehicle. A linear accelerometer 10 is located in the rear portion of the trailer or towed part of the vehicle. The accelerometer, which can be of any known design, is physically located with its sensitive axis perpendicular to the direction of travel thereby being able to detect acceleration to the left or to the right relative to the forward direction of travel.

Accelerometers which are known in the art are generally mechanical devices which sense force per unit mass along a given axis due to acceleration of the vehicle in that direction. However, instead of an accelerometer which measures the direct acceleration of the vehicle in a given direction, the so-called "force balance" type system could also be used. These include a corrective device to bring the accelerometer measuring means back to its zero displacement position. Other accelerometers are of the electrical type which automatically produce an electric output signal responsive to the direction and magnitude of the accelerometers.

The output from accelerometer 10 is fed into transducer 12 which converts the output of the accelerometer into an electrical signal including both a sign as well as a magnitude portion. If an electrical accelerometer were used, there would be no need for separate transducer. The sign of the electrical signal determines whether the left wheels or the right wheels will be activated with braking action. Thus, one output line 14 from the transducer is fed to the left brake 16, while another output line 18 is fed to the right brake 20. Generally, the brake systems of the vehicle include solenoids which control the application of the braking fluid. The electrical signal on lines 14, 18 would be used, therefore, to increase the current flow to the solenoids thereby applying the additional braking fluid to the specific wheel being activated. The stoplights can be triggered by the same signals by applying the electrical current in parallel to the existing lighting system in the vehicle.

Ganged switches 22, 24 are shown controlled by switch control 26. The switch control 26 can include a switch 29 on the dashboard shown schematically at 31, in front of the driver to permit him to completely deactivate the system should the road conditions warrant such action or should he be executing a routine maneuver. The driver is only required to throw the switch in an off position during such maneuvers or such times as he desires the deactivation.

In addition, the switch control 26 could have a fail safe device including, for example, a hydraulic sensing circuit 27 which detects the failure of the hydraulic fluid in the system and thereby automatically deactivates the system. This fail safe device insures that the system of the present invention would be disconnected should the main brakes fail.

Connected to the output lines 14, 18 is a lamp 28 which can be energized by either of the transducer output lines. The lamp can be conveniently located on the dashboard of the vehicle and used as a warning light when braking action has been required by the system of the invention, thereby indicating to the driver the possibility of a skidding condition.

It is noted, that the circuit described merely provides additional braking action to the wheels on one side. This action involves purely a mechanical change in the distribution of hydraulic fluid or air pressure transmitted to the brake of the particular wheel. Normally, the application of braking by depressing a brake pedal in the vehicle applies an equal increase in fluid pressure on both the left and right wheels. The circuit described does not interfere with this equal distribution of braking applied by the driver. However, in addition to the normal distribution applied by the driver, this system further actuates either the left or right brakes independently of the other, while continuing the normal braking action.

Because of the additional braking action without interfering with normal braking, the driver still has the opportunity to apply the brakes and to use whatever corrective action he feels is necessary in any particular emergency. However, since normally there is a delay of as much as one-tenth of a second before the driver can respond to an emergency and apply the brakes, the present system will initiate a correction long before the driver has the opportunity or the capability of intervening.

When the truck is operating along a normal roadway, turns and other maneuver of the truck cause an angular deviation between the cab and the trailer portion which will result in a linear acceleration of the trailer to the left or right.

If this normal acceleration of the trailer during a coordinated maneuver is mistaken for a skidding or jackknifing condition, the exact condition which is to be avoided, will in fact be initiated. For example, in a coordinated turn during which the truck is being maneuvered around a curve bearing to the right, the accelerometer will sense a linear acceleration toward the left. The anti-jackknifing system will apply a differential braking on the left brake which will cause a torque to develop also toward the left. The result will be that the truck will skid across the lane towards the left and into the lane of the oncoming traffic. Thus, the exact skidding condition which is to be avoided will in fact be initiated. It is therefore necessary to discriminate between the normal linear acceleration resulting from a coordinated turn or other regular maneuver the linear acceleration resulting from an emergency condition such as a jackknifing or skidding.

The above-described basic differential braking system is improved according to the present invention so as to avoid the above problem according to which a coordinated maneuver can be mistaken for a skidding or jackknifing condition, with the accompanying problem of initiating precisely the skidding condition which is to be avoided. Thus, according to the present invention it is possible to discriminate between normal linear acceleration resulting from a coordinated turn or other regular maneuver and the linear acceleration resulting from an emergency condition such as jackknifing or skidding. According to the present invention there are two basic types of solution to the problem, one solution being of the type illustrated in FIGS. 13 and 14 while the other solution is of the type illustrated in FIG. 4. According to the solution illustrated in FIGS. 13 and 14 use is made of an additional accelerometer, namely the accelerometer 150 shown in FIG. 2 adjacent the forward portion of the towed section. According to the solution of FIG. 4, use is made of an angular deviation sensor. This angular deviation sensor or the additional accelerometer form a coordinated turn detection means coupled to the towed section for producing a coordinated turn signal as will be apparent from the description which follows. However, either with the type of solution shown in FIGS. 13 and 14 or the type of solution shown in FIG. 4, it is to be understood that the structure will include the circuitry of FIG. 3 such as the switch control 26, the hydraulic fluid sensor 27, the switch 29 at the dash, and the lamp 28.

Referring now to FIG. 13, the outputs of the two accelerometers 10 and 150 are fed to a comparator 152 (FIG. 13) which can be a simple subtraction circuit. If the outputs of the two accelerometers are equal and opposite, as would occur on a normally traveled curve, the output from the comparator 152 would be effectively zero. As a result, no corrective signal will be produced. Should a difference exist between the two accelerometers, it would indicate a skidding or jackknifing condition and only then will corrective action be taken. It is noted that the difference between the two accelerometers can be either in sign and/or in magnitude, and either would result in an indication of a skidding or jackknifing condition.

The output from the comparator 152 is sent to an amplifier 154 which can be a simple cathode follower or emitter follower. The output of the amplifier passes through a normally closed switch 156 which is held closed by means of the relay coil 158 which in turn is controlled by control circuit 160. The control circuit 160 can either be a switch located on the dashboard of the vehicle and available for use by the driver, or can be a disengaging circuit to sense the locking of the wheels, as will hereinafter be described.

Should there exist an output from amplifier 154 it will have both a magnitude and a particular sign. The sign will be indicative of movement toward the right or the left. The polarity of this output signal will pass through either the diode 162 or the diode 164 depending on its sign. The signal will then pass through either relay 166 or 168 which actuates the respective solenoids of the left brake 170 or the right brake 172. A reference voltage 174 is added to the relays to hold them near their threshold operating condition so that very little additional voltage will be necessary to cause the relays to energize the solenoids. The amount of reference voltage applied can be controlled to thereby control the sensitivity of the system, and control the response time to a sensed amount of linear acceleration. Instead of the reference voltage, it could be possible to utilize multistage amplifying circuits for the amplifier 154 and drive the solenoids directly without the use of either the relays or the reference voltage. However, the cost of the system would be increased and the sensitivity would be reduced.

The circuit shown in FIG. 13 is of the type which can work with a DC reference signal such that the actual DC voltage from the vehicle battery can be applied to the relays as reference signal 174, and the accelerometers 10 and 150 can be DC energized. Many accelerometers and transducers which are more reliable and more efficient operate with AC excitation and yeild an AC output. The necessary reference signal which is needed for these AC accelerometers must therefore be obtained from the DC voltage of the battery. The DC voltage could be converted to an AC by any well known circuit, such as by way of example, applying the DC voltage to a pulse generator such as a chopper. The chopped signal can then be filtered in a resonance circuit or bandpass filter to get a sinusoidal output. This is usually then amplified and can then be applied to the AC accelerometers.

Figure 15:
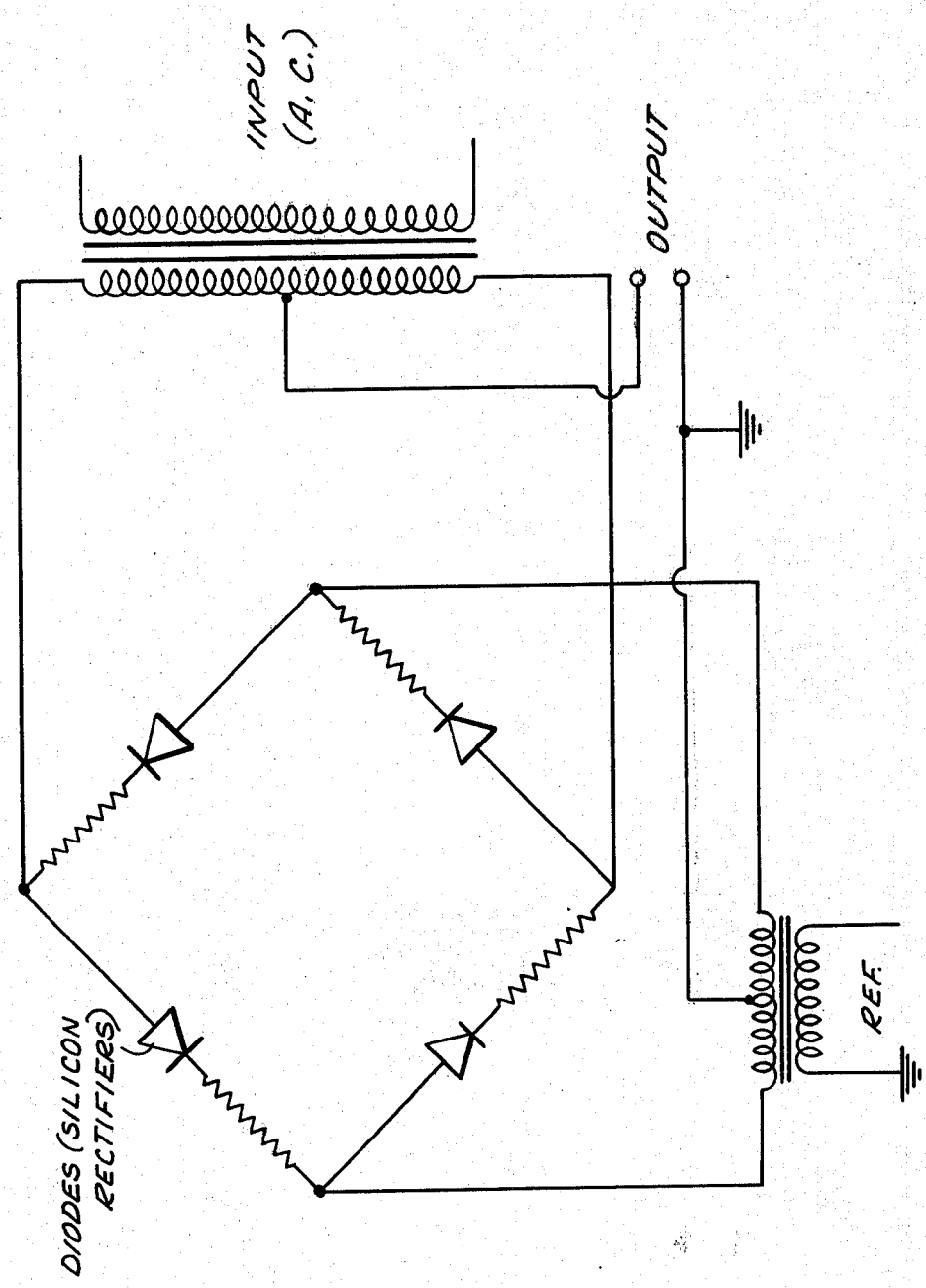
FIG. 15 is a schematic circuit diagram of the phase sensitive demodulator for use with this invention.

Referring now to FIG. 14 there is shown an AC arrangement for the circuit shown in FIG. 13. Each of the like parts are identified by a like numeral. The accelerometers 10 and 150 are energized by means of an AC signal 176 which can be obtained from the DC battery as heretofore explained. The comparator 178 is a center tapped transformer which serves as the substraction circuit. The output of the transformer is an AC signal and after being amplified by the amplifier 154 and passing through the switch 156 passes through a phase sensitive demodulator 180 which serves to rectify the AC output into a DC signal having a particular polarity. Phase sensitive demodulators are well known in the art. One such phase sensitive demodulator is shown by way of example in FIG. 15, which utilizes a diode bridge circuit to produce an output signal after elimination of the residual AC components. The output signal is a positive or negative DC signal depending on the relative phase of the input signal versus the reference signal. The output from the phase sensitive demodulator 180 is applied to the left 170 or right 172 brake by means of the diodes 162, 164 and relays 166, 168. The reference signal 174 can either be a DC or AC reference depending upon how the relays are being activated.

Figure 4:
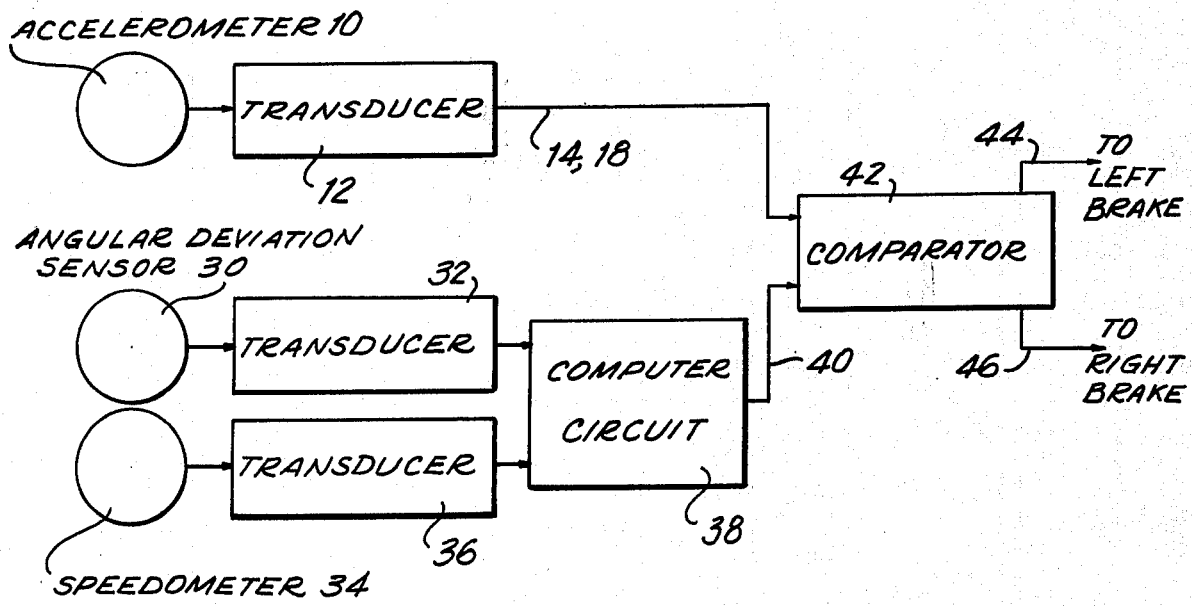
FIG. 4 is a schematic block diagram of one embodiment in accordance with this invention.

Referring now to FIGS. 2 and 4 there is shown a further embodiment of the present invention which provides the discrimination between a coordinated turn and a jackknifing condition. An angular deviation sensor 30 is located in a position to detect the angular deviation $\alpha$ between the cab and the trailer portions. Usually, such angular deviation sensors can be placed at the hinge joint whereby they are capable of detecting the relative rotation between the cab and the trailer. Such angular deviation sensors are well known in the art and any such device can be used in accordance with this invention. The output $\alpha$ from sensor 30 is fed into a transducer 32 which converts the position indication into an electrical signal containing both a sign indicating the direction of the angle (indicated L or R in FIG. 2) and a magnitude indicating the degree of the deviation angle between the cab and the trailer. The output from the vehicle speedometer 34, which provides a reading of the speed V, is fed into a transducer 36 to produce an electrical signal proportional to the speedometer readout.

The square of the vehicle velocity V times the angular deviation $\alpha$ is equal to a transverse linear acceleration within a constant scale factor $\sigma$. In other words, acceleration can be determined by combining the angular deviation $\alpha$, the velocity V, and a constant scale factor $\sigma$ in accordance with the following formula;

$$\sigma V^2 \alpha$$

Computer circuit 38 is utilized to combine the electrical values in accordance with the above mentioned formula. Such computer circuit can include a square function potentiometer which would provide the square of the velocity and a multiplying circuit which would combine the angular deviation with the output of the square function potentiometer. The constant $\sigma$ can be introduced by means of suitable resistors or other multiplying circuits. Such circuitry is well known in the art and any such circuits can be utilized to produce the above mentioned formula.

The output of the computer circuit 38 will therefore represent the sign and magnitude of the linear acceleration of the trailer portion of the vehicle for a coordinated turn or a given maneuver of the vehicle. The accelerometer 10 connected to the rear of the vehicle, as previously described, will produce an output through transducer 12. The output taken along lines 14, 18 will also contain a sign as well as a magnitude. The output from computer circuit 38 on line 40 as well as the signals on lines 14, 18 are fed into a comparator 42. The comparator 42 can be a simple subtraction circuit producing an output $\Delta$, wherein $\Delta = \sigma V^2 \alpha - A$, wherein $A$ is the linear accelerometer output. Any deviation of the output on lines 14, 18 from the output on line 40 will be interpreted by the comparator as a skidding condition. The deviation will indicate that the linear accelerometer 10 has detected a movement of the rear of the vehicle which is more than that expected from a given coordinated turn or truck maneuver. It is also possible that the linear accelerometer 10 in the rear of the vehicle will detect an acceleration in the opposite direction from that which should be expected from a coordinated turn or truck maneuver, which will again indicate a skidding condition.

The output signal from the comparator 42 will contain a sign as well as a magnitude. The sign of the output will determine which side of the vehicle should receive the braking action. The output along line 44 will lead to the left wheel brake and the output along line 46 will lead to the right wheel brake.

The circuit shown in FIG. 4 can either be a DC or AC version. Therefore, when utilizing a DC version the accelerometers can either be of the self energizing type or can be energized by an AC signal. Furthermore, it is understood that transducers need not be utilized if the accelerometer is of a type which produces its own electrical output signal. At the same time, an AC system can be utilized wherein the accelerometers would be of the AC energized type and an AC signal utilized as a reference. In that case, the output from the compartor would first be sent to a phase sensitive demodulator as was described in connection with FIG. 14. Although FIG. 4 did not include the amplifier or the relay switch, it is understood that such could be included as was described in connection with FIGS. 13 and 14.

When a jackknifing or skidding condition occurs, the circuits described in connection with FIGS. 3 and 4 will provide corrective braking action to a wheel or wheels on one side of the vehicle. However, as the skidding continues, too much braking action may be applied and the result may be wheel locking which, instead of decreasing the skid, may in fact reduce the coefficient of friction and thereby tend to increase the skid.

Figure 5:
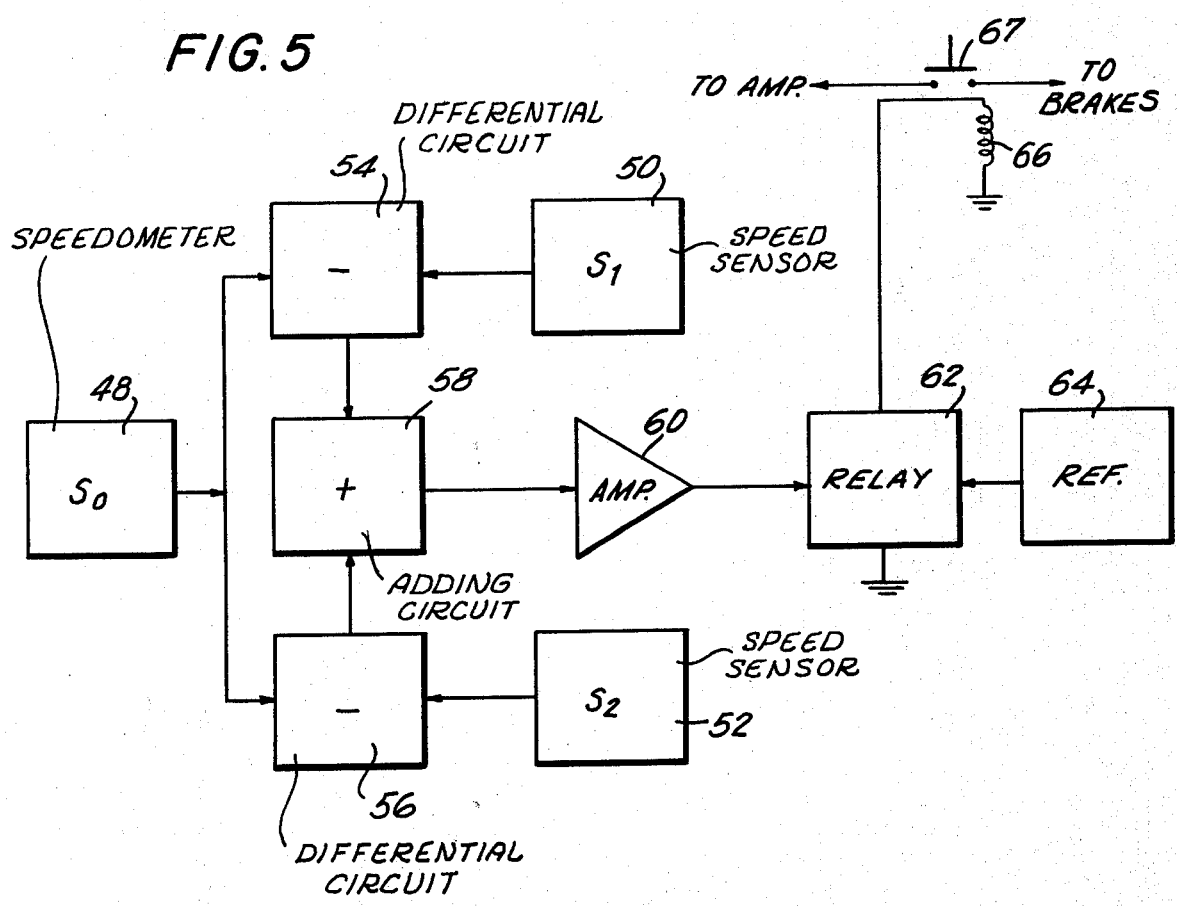
FIG. 5 is a schematic block diagram of an embodiment for preventing wheel locking.

Referring now to FIG. 5 there is shown a circuit which avoids wheel locking during the course of a corrective operation; such circuit would be included as the control circuit shown in FIGS. 13 and 14. the circuit includes a speedometer 48 which senses the speed of the front wheel of the trailer and produces an output $S_o$. Additional speed sensors 50 and 52 respectively produce outputs $S_1$ and $S_2$, representing the speed of the rear right and left rear wheels. A differential circuit 54 provides an output representing the difference between the front wheel speed $S_o$ and the right wheel speed $S_1$, while a differential circuit 56 produces the differential signal between the front wheel speed $S_o$ and the left wheel speed $S_2$. The outputs from the two differential circuits are combined in the adding circuit 58. The output is then amplified through amplifier 60. The amplified output then controls a relay 62 which actuates the solenoid 66 controlling the switch 67. A reference signal 64 is applied to the relay 62 to provide a reference voltage across the relay. The switch 67 is the same as the series switch 156 shown in FIGS. 13 and 14.

In operation, when the front and rear wheels of the trailer are operating at substantially the same speed, there will not be any output from the amplifier 60 and the anti-jackknifing system can operate normally to apply differential braking when a jackknifing condition is sensed. However, if wheel locking occurs in either the left or right rear wheel of the trailer, an output will be produced on amplifier 60 which then activates the relay 62 to cause the switch 67 to pen, thereby disconnecting the anti-jackknifing circuit. As a result, the corrective braking action will stop and the wheel locking condition will be released. After release of the corrective braking action, the switch will again close and corrective braking action will again be applied. Thus, an intermittent arrangement is provided so that as brake locking occurs corrective braking is stopped, and as the wheel locking stops, the corrective action is resumed. Instead of applying the output from the relay 62 to a single solenoid 66, it is possible to utilize two separate outputs, respectively, from the two different circuits 54, 56 and apply these signals respectively to individual relays connected in series with the relays 166, 168 shown in FIG. 13. In this manner, two separate disengaging signals can be provided to each of the two separate brakes.

The entire system operates electrically with the source of energy being the 12 volt battery of the vehicle or a separate voltage supply which may be used for emergencies. If a higher voltage is necessary it may be achieved by using a chopper-transformer combination as is well known in the art and as is commonly used for the car radio.

Although the various parts of the block diagrams heretofore described relate to circuits which are well known in the art, for the sake of completeness some examples will be shown to indicate the simplicity of the type of circuits which can be used for the transducers as well as the comparators. It will be understood however, that while some examples are hereinafter described, these are merely by way of example and by no means do they limit the type of circuits which can be used to carry out the function referred to above.

Figure 6:
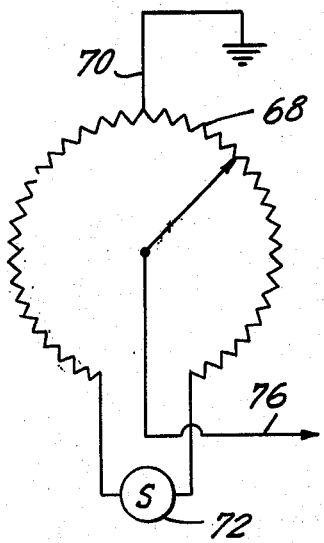

FIG. 6 shows one possible transducer circuit which includes a potentiometer 68 having its center grounded at 70. The ends of the potentiometer are energized by means of an electrical supply 72. The wiper arm 74 provides the output signal on line 76. If an AC source is used at 72, the output signal on line 76 will contain a phase as well as a magnitude portion. Should a DC supply be used the output will contain an appropriate sign as well as a magnitude. When using the transducer in connection with the angular deviation sensor the potentiometer could typically be connected to the cab portion of the vehicle and the wiper arm be connected to the trailer portion thereby providing an output signal as a function of the relative angular deviation between the cab and the trailer. When using the transducer in connection with the linear accelerometer, the potentiometer can be fixed on the trailer portion and the wiper arm can be connected to the pendulous mass of the accelerometer thereby providing an output signal as a function of the linear acceleration.

Figure 7:
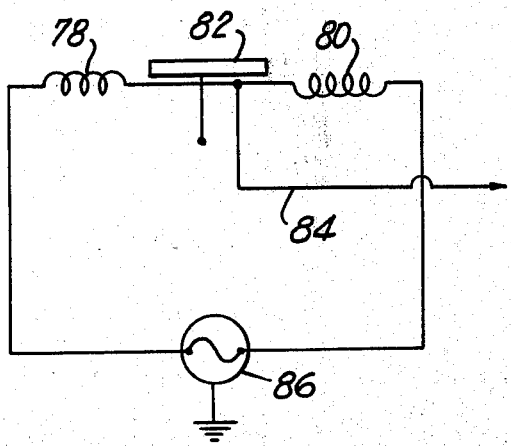

Referring now to FIG. 7, another type of transducer is shown containing coils 78 and 80 with an iron piece 82 capable of passing between the coils 78 and 80. The output signal along line 84 is taken from the approximate midpoint between the two coils 78, 80. The ends of the coils 78, 80 are energized from an AC source 86. The output signal will contain both a phase and a magnitude portion. When using the transducer in connection with the angular deviation sensor the coils 78, 80 can be connected to the cab portion and the iron 82 can be connected to the trailer portion. When using the transducer in connection with the accelerometer, the coils 78, 80 could be fixed and the iron 82 could be connected to the pendulous mass of the accelerometer.

Referring now to FIG. 8, yet another type of transducer is shown providing a variable capacitance output from the combination of capacitor plates 88 and 90 with movable capacitor plate 92 connected therebetween and having its midpoint ground at 94. The capacitor plates 88, 90 are provided with an energy source 96 through a transformer 98 having a tapped secondary 100 through which the output is taken. The output is provided with both a phase and a magnitude portion. When using the transducer in connection with the angular deviation sensor the capacitor plate 92 could be connected to the cab with the capacitor plates 88, 90 connected to the trailer portion. When using the variable capacitance circuit of FIG. 8 in connection with the accelerometer, the plates 88, 90 could be connected to the trailer with the plate 92 connected to the pendulous mass of the accelerometer.

Although three examples of transducers are shown it is understood that other types of well known transducers could be used, as for example the standard synchro transducer or various bridge circuits. Furthermore, the parts of the transducer connected to the cab and trailer portions could be interchanged, and similarly the portions connected between the trailer and the accelerometer could be interchanged.

Referring now to FIGS. 9-11 there are shown various ways of connecting the linear accelerometer mounted at the rear of the trailer portion and having its sensitive axis transverse to the direction of motion of the vehicle. The linear accelerometer could contain a fixed mass portion 102 (FIG. 9) which is suspended in pendulum fashion from a frame 104 which in turn is connected to the rear of the vehicle. The earth's gravity in this case would be in a downward direction and the sensitive axis would be as shown by the arrows contained within the frame. FIG. 10 shows a similar mass 102 which is spring mounted within the frame 104 by suspension springs 106, 108. FIG. 11 shows again mass 102 connected within frame 104 with additional restraints 110 and 112. Although three examples have been shown, it is well understood that any of the well known linear accelerometers could be used and connected in well known arrangements to provide an output indicative of the acceleration of the trailer portion to the left or to the right of the direction of travel of the vehicle.

Referring now to FIG. 12 there is shown one embodiment of the comparator circuit which may be used in connection with this invention. The inputs to the comparator are provided at terminal points 114, 116. The two input signals pass through the resistors 118, 120 respectively and are fed into a bridge circuit having a diode 122 in one arm and an oppositely poled diode 124 in the other arm. The remaining two arms of the bridge each contain respectively an RC parallel circuit 126, 128. The diagonal of the bridge opposite the input diagonal is grounded at 130. The other two diagonals of the bridge provide the midpoint 135 between the output signals 132 and 134. The comparator will provide an output which is proportional to the difference between the two inputs signals. Additionally, when the signal from 114 is greater than that from 116, the output will appear larger on line 132. When the reverse condition exists the output will appear large on line 134. Resistor 118 is shown as being a variable resistor to permit adjustment of the sensitivity of the comparator. Thus, it is possible to provide flexibility to the system, using the comparator shown in FIG. 12, so that the system will not immediately react to any deviation between expected and actual acceleration signals but will provide some delay prior to actual braking action taking place or other corrective measures. It is possible to connect variable resistor 118 on the dashboard in front of the driver so that he can adjust the sensitivity of the system during travel of the vehicle. Thus, at certain times under strong wind conditions or high speed velocities the driver may want to desensitize the system, and he may do so by merely adjusting the resistor which may be controlled by a single knob on the dashboard panel.

While this invention has been described with regard to its preferred embodiments it will be obvious to those skilled in the art that there can be changes and modifications made therein without departing from the invention, and it is aimed, therefore, to cover in the appended claims all such changes and modifications as fall within the true spirit and scope of the invention.

What is claimed is:

1. An anti-jackknifing and skidding control system for a vehicle having a towed section and a towing section and including left wheel and right wheel brakes and actuating means therefor, said control system comprising at least one accelerometer means located adjacent a rear portion of the towed section and having a sensitive axis perpendicular to the direction of forward movement of the vehicle for detecting left and right acceleration of the rear portion of the towed section and producing an output signal responsive thereto, coordinated turn detection means coupled to said towed section and producing a coordinated turn signal, combining means coupled to said accelerometer means and said coordinated turn detection means for distinguishing a proper maneuver from a jackknifing and skidding condition by combining said output signal with said coordinated turn signal to produce a first electrical signal responsive to detected acceleration to the left and a second electrical signal responsive to detected acceleration to the right, and coupling means for coupling said first electrical signal to the actuating means controlling the left wheel brake for applying a braking action only to the left wheel brakes and for coupling said second electrical signal to the actuating means controlling the right wheel brake for applying a braking action only to the right wheel brakes, whereby a differential braking action is achieved only for a jackknifing and skidding condition and not for a proper maneuver, and transducer means coupled between said accelerometer means and said combining means.

2. An anti-jackknifing and skidding control system as in claim 1 and wherein said coordinated turn detection means includes a second accelerometer means located adjacent a forward portion of the towed section and having a sensitive axis perpendicular to the direction of forward movement of the vehicle for detecting left and right acceleration of the forward portion of the towed section and producing an output signal responsive thereto, and wherein said combining means includes a differential circuit means for providing an output responsive to the difference between the outputs from said one and said second accelerometer means.

3. An anti-jackknifing and skidding control system as in claim 2 and wherein both of said accelerometer means are AC energized and wherein said differential circuit means includes a transformer having a center tapped primary and a secondary, said accelerometer means both having their outputs respectively connected across said primary, and said differential output being taken across said secondary.

4. An anti-jackknifing and skidding control system as in claim 3 and further comprising a phase sensitive demodulator coupled to the output of said secondary of said transformer for providing said first and second electrical signals.

5. An anti-jackknifing and skidding control system as in claim 2 and wherein said coupling means comprises a first circuit means coupled to the actuating means of said left wheel brakes and a second circuit means coupled to the activating means of said right wheel brakes, each of said circuit means including in series, a relay means and diode means, the diode means being respectively of opposite polarity.

6. An anti-jackknifing and skidding control system as in claim 5 and further comprising reference voltage means coupled to each of said relay means.

7. An anti-jackknifing and skidding control system as in claim 1 and wherein said means for coupling include switch means for disconnecting said first and second electrical signals from said left and right wheel brakes.

8. An anti-jackknifing and skidding control system as in claim 7 and further comprising control circuit means coupled to said switch means, said control circuit means comprising first wheel speed detection means for detecting the speed of the front wheels of the towed section, second wheel speed detection means for detecting the speed of the right rear wheels of the towed section, third wheel speed detection means for detecting the speed of the left rear wheels of the towed section, a first differential circuit means for comparing said first two mentioned wheel speeds and producing a first control signal in response thereto and a second differential circuit means for comparing said first and third mentioned wheel speeds and producing a second control signal in response thereto, said first and second control signals operating said switch means.

9. An anti-jackknifing and skidding control system as in claim 8 and further comprising an adding circuit for combining said first and second control signals and producing a brake lock signal, said switch means being a relay operated contact switch, and wherein said brake lock signal operates said relay.

10. An anti-jackknifing and skidding control system as in claim 7 wherein said switch means include sensor means responsive to the failure of the brake system of the vehicle for activating the switch means.

11. An anti-jackknifing and skidding control system as in claim 7 wherein said switch means include control means located on the dashboard of the towing section of the vehicle for activating said switch means.

12. An anti-jackknifing and skidding control system as in claim 1 and further comprising lamp means located on the dashboard of the towing section of the vehicle and energized by either of said first and second electrical signals.

13. An anti-jackknifing and skidding control system as in claim 1 wherein said transducer comprises inductor coil means having opposing ends and a movable core adapted to pass therethrough, the midpoint of said coils being taken as the output of said transducer, and electrical source means connected across the opposing ends of said coil means.

14. An anti-jackknifing and skidding control system as in claim 1 wherein said combining means comprise a bridge circuit having a first pair of diagonals one of which is a grounded terminal and the other of which is a control terminal, a second pair of diagonals providing two output terminals, first and second bridge arms respectively connected between the control terminal and the two output terminals, oppositely poled diode means connected respectively within said first and second bridge arms, third and fourth bridge arms connected respectively between the grounded terminal and the two output terminals, a parallel RC network connected within each of said thrid and fourth bridge arms, first and second input terminals, a fixed resistance means connected between one of said input terminals and the control terminal and a variable resistance means connected between the other input terminal and the control terminal.

* * * * *